United States Patent Office 3,328,348
Patented June 27, 1967

3,328,348
TRIFLUOROMETHYLPHENYL POLYSILOXANES
Christian R. Sporck, Burnt Hills, N.Y., assignor to General Electric Company, a corporation of New York
No Drawing. Filed Dec. 18, 1961, Ser. No. 160,272
5 Claims. (Cl. 260—46.5)

This invention relates to cyclic organopolysiloxanes in which one of the silicon atoms contains at least one trifluoromethyl-substituted phenyl group and the remaining silicon atoms contain 2 silicon-bonded phenyl groups. This invention also is directed to polymeric materials prepared from these cyclic materials.

Heretofore, a number of cyclic polydiorganosiloxanes and polymers prepared therefrom have been known in the art. The polymers prepared from these materials are useful in the preparation of silicone rubber which is resistant to wide temperature variations and which is inert to many common organic solvents. However, the known high molecular weight linear polydiorganosiloxanes suffer from certain disadvantages. For example, the conventional high molecular weight linear polydiorganosiloxanes are primarily dimethylpolysiloxanes but sometimes also contain intercondensed diphenylsiloxane units. While these materials can be converted to silicone rubbers having satisfactory properties for many applications, the physical properties such as tensile strength, elongation and tear resistance of these rubbers are not as high as desired. Neither is the hydrolytic stability or solvent resistance of these polymers as high as desired. It is possible to increase the tensile strength of silicone rubber by increasing the phenyl content of the silicone rubber. However, when a high polymer is prepared which contains only diphenylsiloxane units, it is found that the resulting material is so hard and intractable that it is extremely difficult to fabricate into the desired shape. When attempts are made to copolymerize dimethylpolysiloxanes and diphenylpolysiloxanes to form phenyl-containing polymers, it is found that the random nature of the resulting material is such that no significant improvement in physical properties is noted. Furthermore, the hydrolytic stability and solvent resistance of the phenyl-containing material is not significantly greater than the hydrolytic stability of conventional dimethyl silicone rubber.

In my copending joint application with John F. Brown, Jr., and Howard A. Vaughn, Jr., Ser. No. 160,266, now abandoned, filed concurrently herewith and assigned to the same assignee as the present invention, there are disclosed ordered polymers of dimethylpolysiloxane units and diphenylsiloxane units which are prepared by the homopolymerization of either 1,1-dimethyl-3,3,5,5-tetraphenylcyclotrisiloxane or 1,1-dimethyl-3,3,5,5,7,7-hexaphenylcyclotetrasiloxane. These ordered dimethylsiloxane-diphenylsiloxane copolymers exhibit markedly improved tensile strength over random copolymers containing both diphenylsiloxane units and dimethylsiloxane units. However, these materials do not possess as high a degree of hydrolytic stability or solvent resistance as desired.

The present invention is based on my discovery of a new class of cyclic polydiorganosiloxanes which can be polymerized to form ordered polymers, all of which are thermoplastic materials which can be molded to desired shapes and all of which have improved hydrolytic stability and resistance to aliphatic solvents and many of which are convertible to the solid, cured, elastic state to form silicone rubbers which have the excellent physical properties of my above-mentioned copending joint application with John F. Brown, Jr., and Howard A. Vaughn, Jr., and which also have improved hydrolytic stability and resistance to aliphatic hydrocarbon solvents. These cyclic polydiorganosiloxanes can also be copolymerized with other cyclic polydiorganosiloxanes to produce valuable materials.

The cyclic polydiorganosiloxanes of the present invention have the formula:

(1) 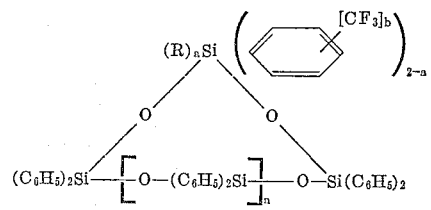

where R is a monovalent hydrocarbon radical free of aliphatic unsaturation and $a$ and $n$ are whole numbers equal to from 0 to 1, inclusive. The cyclopolysiloxanes of Formula 1 can be polymerized to provide high molecular weight linear polydiorganosiloxanes consisting essentially of the following recurring structural units:

(2)

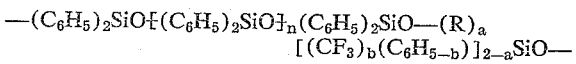

where R and $a$ and $n$ are as previously defined and $b$ is an integer equal to from 1 to 3, inclusive. In addition to preparing polymers from the cyclic polydiorganosiloxanes of Formula 1 alone, these cyclic materials can be copolymerized with one or more other cyclic polydiorganosiloxanes to provide other high molecular weight polydiorganosiloxanes having desirable properties.

As is apparent from Formula 1, the cyclic polydiorganosiloxanes of the present invention are either cyclotrisiloxanes or cyclotetrasiloxanes, depending upon the value of $n$. All but one of the silicon atoms in the cyclotrisiloxane or cyclotetrasiloxane contain two silicon-bonded phenyl groups and the remaining silicon atom can contain up to one silicon-bonded monovalent hydrocarbon radical free of aliphatic unsaturation and one or two silicon-bonded phenyl groups which contain from one to three nuclear-substituted trifluoromethyl groups. Illustrative of the cyclic polydiorganosiloxanes within the scope of Formula 1 are, for example, m-trifluoromethylphenyl pentaphenylcyclotrisiloxane; 1,1-bis(p-trifluoromethyl) - phenyl - 3,3,5,5,7,7 - hexaphenylcyclotetrasiloxane; 1 - methyl - 1 - (3,5 - bis - trifluoromethyl)-phenyl - 3,3,5,5 - tetraphenylcyclotrisiloxane; tris - (2,3,5-trifluoromethyl) - phenyl heptaphenylcyclotetrasiloxane, etc.

Illustrative of the monovalent hydrocarbon radicals free of aliphatic unsaturation which are represented by R of Formula 1 are, for example, alkyl radicals, e.g., methyl, ethyl, propyl, butyl, octyl, etc. radicals; cycloalkyl radicals, e.g., cyclohexyl, cycloheptyl, etc. radicals; aryl radicals, e.g., phenyl, tolyl, xylyl, naphthyl, etc. radicals; aralkyl radicals, e.g., benzyl, phenylethyl, etc. radicals. Preferably, the radical represented by R is a methyl or phenyl radical.

The cyclic polydiorganosiloxanes of Formula 1 are prepared by effecting reaction between an hydroxy chain-stopped polydiphenylsiloxane having the formula:

(3) 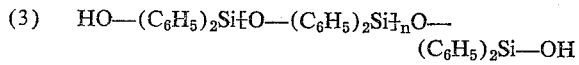

where $n$ is as previously defined, and a diorganodihalogenosilane having the formula:

(4)

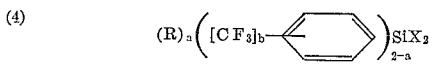

where X is halogen, preferably chlorine, and R and $a$ and $b$ are as previously defined.

Within the scope of Formula 3 are two compounds, namely, tetraphenyldisiloxanediol-1,3 and hexaphenyltrisiloxanediol-1,5. Within the scope of the diorganodihalogenosilanes of Formula 4 are a number of compounds, many of which are described in United Kingdom Patent 800,280 of Aug. 20, 1958 and United States Patent 2,571,090—Kohl. In general, these diorganodihalogenosilanes are prepared by a conventional Grignard coupling reaction. For example, phenyl-p-trifluoromethylphenyldichlorosilane can be prepared by reacting p-trifluoromethylphenyl chloride with phenyltrichlorosilane and magnesium turnings in a solvent such as tetrahydrofuran, following the general teachings of Patent 2,894,012—Ramsden et al. Illustrative of the many diorganodihalogenosilanes within the scope of Formula 4 are, for example, the phenyl-p-trifluoromethylphenyldichlorosilane mentioned above as well as bis(m-trifluoromethyl)-phenyldichlorosilane; methyl-3,5-bis-(trifluoromethyl)phenyldichlorosilane and bis(tris-2,4,5[trifluoromethyl])phenyldichlorosilane.

The reaction to form the cyclic polydiorganosiloxane of Formula 1 theoretically involves one mole of the hydroxyl chain-stopped material of Formula 3 and one mole of the diorganodihalogenosilane of Formula 4. The result of the reaction is to form the cyclic polydiorganosiloxane by the splitting out of two moles of hydrogen halide with the formation of two new siloxane linkages. To facilitate the reaction, a hydrogen halide acceptor is employed. A suitable hydrogen halide acceptor is any organic tertiary amine, such as pyridine, triethylamine, N,N-dimethyl aniline, etc. In theory, two moles of the hydrogen halide acceptor are required for each mole of hydrogen halide generated. While the theoretical ratio of reactants has been described above, the ratio of the various ingredients can vary within wide limits. For example, the hydroxyl chain-stopped polydiphenylsiloxane of Formula 3 can be employed in an amount equal to from about 0.5 to 2 moles per mole of the diorganodihalogenosilane of Formula 4. Preferably, the hydrogen halide acceptor is employed in excess with there being from about 3 to 30 moles of hydrogen halide acceptor per mole of whichever of the other two reactants is present in the smaller molar amount. Preferably, the reaction is effected with equimolar amounts of the hydroxyl chain-stopped polydiphenylsiloxane of Formula 3 and the diorganodihalogenosilane since the reaction is essentially quantitative. Employing these equimolar proportions, the purification of the desired cyclic polydiorganosiloxane is simplified since no significant amount of unreacted starting materials are present in the reaction mixture.

Because the hydroxyl chain-stopped polydiphenylsiloxanes of Formula 3 and the cyclic polydiorganosiloxanes of Formula 1 as well as many of the diorganodihalogenosilanes are solid materials at room temperature, it is preferable to effect the reaction in the presence of a solvent which is inert to the reactants under the conditions of the reaction and which is a solvent for all of the reactants and the reaction products except the product resulting from the reaction between the hydrogen halide and the hydrogen halide acceptor. Suitable solvents include diethyl ether, tetrahydrofuran, tetrahydopyran, n-hexane, xylene and toluene. In general, the solvent is employed in the ratio of from about 1 to 50 parts by weight based on the total weight of the other components of the reaction mixture.

Because the reaction to form the cyclic polydiorganosiloxanes of Formula 1 proceeds at a satisfactory rate at room temperature, it is preferred to conduct the reaction at such temperature, i.e., a temperature of from about 15 to 25° C. However, it should be understood that the use of elevated temperatures, e.g., temperatures of from about 25 to 120° C. is not precluded. Depending upon the proportions of ingredients, the reaction temperature and the particular solvent employed, the time required for effecting reaction between the hydroxyl chain-stopped polydiphenylsiloxane of Formula 3 and the diorganodihalogenosilane of Formula 4 can vary from about 1 hour to 24 hours or more.

After the reaction is completed, the reaction mixture consists of a solution of the desired cyclic polysiloxane of Formula 1 together with any unreacted starting materials and a precipitate of hydrogen halide with the hydrogen halide acceptor. This precipitate is filtered from the reaction mixture and the resulting filtrate is stripped of solvent and volatile starting materials to produce a crude product. This crude product is recrystallized from a solvent such as benzene or hexane or cyclohexane or a mixture of these materials to produce the purified cyclic polydiorganosiloxane of Formula 1.

Polymeric materials consisting essentially of the recurring unit of Formula 2 can be formed by the polymerization of the cyclic polydiorganosiloxane of Formula 1 by several methods. For example, the cyclic polydiorganosiloxane can be polymerized by heat alone, by maintaining the cyclopolysiloxane at a temperature of from about 250 to 350° C., preferably in an inert atmosphere such as nitrogen or a noble gas for about 15 minutes to 1½ hour, during which time one of the siloxane bonds of the cyclic polydiorganosiloxane opens up and permits a conventional rearrangement and condensation to form a tough, thermoplastic polymer soluble in benzene and toluene. This polymer can contain from about 15 to 9,000 or more, and preferably from about 160 to 9,000 or more of the units of Formula 2, depending upon the reaction temperature and time. In general, these polymers have molecular weights greater than about 10,000 and preferably of the order of from 50,000 to 5,000,000 or more. These materials have an intrinsic viscosity of the order of from about 0.25 to 4.0 deciliters per gram.

Another, and the preferred, method of forming the polymers of the present invention is by the catalytic rearrangement and condensation of the cyclic polydiorganosiloxanes of Formula 1. This rearrangement and condensation is effected in the presence of a typical alkaline organopolysiloxane rearrangement and condensation catalyst such as potassium hydroxide. The rearrangement and condensation catalyst is conventionally added to the organopolysiloxane as a solution in octamethylcyclotetrasiloxane, for example, as a solution containing from about 0.1 to 1% by weight potassium hydroxide. In general, the amount of potassium hydroxide added is sufficient to provide about 10 to 100 parts by weiht potassium hydroxide per million parts by weight of the cyclic polydiorganosiloxane. The catalytic polymerization is effected by heating the mixture of potassium hydroxide and the cyclic polydiorganosiloxane at a temperature above the melting point of the polydiorganosiloxane so as to insure thorough mixing of the catalyst with the cyclic material. In general, the polymerization is effected at a temperature of from about 120 to 170° C. with polymerization being completed in a time of from a few seconds up to one hour or more. The polymers resulting from this base catalyzed polymerization are identical to those produced by the thermal polymerization previously described.

In addition to forming polymers of the cyclic polydiorganosiloxanes of Formula 1 alone, copolymers can be prepared by reacting the cyclic polydiorganosiloxane of Formula 1 with other cyclic polydiorganosiloxanes. Preferably, in preparing these copolymers, the base catalyzed rearrangement and condensation reaction described above is employed.

Suitable cyclic polydiorganosiloxanes for copolymerization with the cyclic polydiorganosiloxanes of Formula 1 include, for example, hexaphenylcyclotrisiloxane, octamethylcyclotetrasiloxane, hexamethylcyclotrisoloxane, or octaphenylcyclotetrasiloxane; 1,1-dimethyl-3,3,5,5-tetraphenylcyclotrisiloxane which is described and claimed in my copending application Ser. No. 160,264, now abandoned; 1,1-dimethyl-3,3,5,5,7,7-hexaphenylcyclotetrasiloxane which is described and claimed in the copending application of Howard A. Vaughn, Jr. Ser. No. 160,267, now abandoned; triphenylsiloxy pentaphenylcyclotrisiloxane or triphenylsiloxy heptaphenylcyclotetrasiloxane which are described and claimed in my copending application Ser. No. 160,263; vinylpentaphenylcyclotrisiloxane or vinylheptaphenylcyclotetrasiloxane which are described and claimed in my copending application Ser. No. 160,268; 1 - methyl - 1 - vinyl - 3,3,5,5 - tetraphenylcyclotrisiloxane or 1 - methyl - 1 - vinyl - 3,3,5,5,7,7-hexaphenylcyclotetrasiloxane which are described and claimed in my copending application Ser. No. 160,269; compounds such as p-chlorophenylheptaphenylcyclotetrasiloxane and 1,1 - bis(p-chlorophenyl) - 3,3,5,5 - tetraphenylcyclotrisiloxane and 1 - methyl - 1 - p-chlorophenyl-3,3,5,5 - tetraphenylcyclotrisiloxane which are described and claimed in my copending application Ser. No. 160,265; beta-cyanoethylpentaphenylcyclotrisiloxane and 1,1-bis-(gamma-cyanopropyl) - 3,3,5,5,7,7 - hexaphenylcyclotetrasiloxane which are described and claimed in my copending application Ser. No. 160,271; methylpentaphenylcyclotrisiloxane and methylheptaphenylcyclotetrasiloxane which are described and claimed in my copending application Ser. No. 160,270; and cyclic materials containing both siloxane linkages and silphenylene linkages in the ring such as are described and claimed in my copending application Ser. No. 160,262. All of the aforementioned copending applications are filed concurrently herewith and assigned to the same assignee as the present invention.

The copolymerization of the cyclic polydiorganosiloxanes of Formula 1 with the aforementioned other cyclic polydiorganosiloxanes results in high molecular weight polysiloxanes which are tough materials which ar soluble in solvents such as benzene and toluene. When copolymeric organopolysiloxanes are prepared as described above, the procedure employed is identical to that employed in preparing the polymers consisting of the recurring units of Formula 2. The ratio of the various cyclic polydiorganosiloxanes used in the preparation of the linear copolymers can vary without limit, depending upon the characteristics desired in the final copolymeric material. For example, these copolymers can be prepared from a mixture of cyclic polydiorganosiloxanes containing from 0.1 to 99% by weight of the cyclic polydiorganosiloxanes of Formula 1 based on total weight of the cyclopolysiloxane mixture.

While all of the polymers consisting essentially of the recurring units of Formula 2 are tough, thermoplastic materials the detailed properties of these polymers are dependent upon their chemical nature. For example, those polymers consisting essentially of the recurring units of Formula 2 where $a$ is equal to 0, and those polymers of Formula 2 where $a$ is equal to 1 and R is an aryl radical are especially hard materials but soften appreciably at temperatures of the order of 50° C. or higher and at these temperatuers can be molded into the desired shape. Because all of the substituents on these two types of polymers are aryl radicals or substituted aryl radicals the materials cannot be cross-linked by conventional means such as ionizing radiation or free radical chemical catalysts.

On the other hand polymers consisting essentially of the recurring structural units of Formula 2 where $a$ is equal to 1 and R is an alkyl radical, a cycloalkyl radical or an aralkyl radical can be cross-linked to form cured silicone rubbers. All of the polymers within this group can be crossed by ionizing irradiation, the details of which will be described hereinafter. In addition those polymers within this group in which the R group is an alkyl radical having two or more carbon atoms, a cycloalkyl radical, or an aralkyl radical in which the alkyl portion of the radical contains at least two carbon atoms can be cross-linked by free radical catalysts in addition to ionizing radiation. The details of such free radical cross-linking will be described in detail hereinafter.

The precise nature of the copolymers prepared by the rearrangement and condensation of a mixture of a cyclic polydiorganosiloxane within the scope of Formula 1 and one or more of the other polydiorganosiloxane cyclic materials described above depends upon the particular cyclic polydiorganosiloxanes employed and on the ratio of such cyclopolysiloxanes. Copolymers containing at least one methyl group per three silicon atoms can be cross-linked by ionizing radiation. Copolymers containing at least one vinyl group per 100 silicon atoms, at least one cycloalkyl radical per 100 silicon atoms or at least one arylethyl or higher aralkyl radical per 100 silicon atoms, or at least one pair of adjacent methyl-containing silicon atoms per 100 silicon atoms can be cross-linked by either ionizing radiation or by free radical catalysts to produce valuable silicone rubber.

Where ionizing radiation is employed to cross-link polymers or copolymers of the present invention, suitable sources of radiation are pile irradiation or electron irradiation. Preferably high energy electron irradiation is employed, following the procedure of Patent 2,763,609—Lawton et al. In general, such cross-linking or curing is effected by subjecting the polymer or copolymer to electrons having energies in the range of from about 50,000 to 20,000,000 electron volts to a dose of about $100 \times 10^6$ to $1,000 \times 10^6$ roentgens. This high dosage is required because of the irradiation resistance imparted by the high phenyl content of the gum.

Where free radical catalysts are employed to cross-link the polymers and copolymers of the present invention to form silicone rubbers, any of the conventional free radical catalysts known to the art can be employed. Illustrative of such catalysts are the organoperoxides such as benzoyl peroxide, tertiary butyl perbenzoate, dichlorobenzoyl peroxide and di-alpha-cumyl peroxide, as well as other free radical generating materials such as zirconyl nitrate, etc. In general, these free radical catalysts are present in an amount equal to from about 1 to 10% by weight based on the weight of the polydiorganosiloxane gum. A satisfactory curing catalyst for these catalyzed copolymers is a press cure at a temperature of from 125 to 150° C. for 10 to 20 minutes followed by a post-cure at a temperature of about 150 to 250° C. for 24 hours.

Cross-linking of the polymers or copolymers of the present invention, either by free radical catalysts or ionizing radiation can take place in either the presence or absence of conventional silicone rubber fillers.

Among the fillers which are useful for incorporation into the polydiorganosiloxane gums of the present invention are the various silica fillers such as silica aerogel, fumed silica and precipitated silica as well as other types of fillers such as titanium dioxide, calcium silicate, ferric oxide, chromic oxide, cadmium sulfide, asbestos, glass fibers, calcium carbonate, carbon black, lithopone, talc, etc. Preferably, the filler employed is a finely divided silica filler. The amount of filler employed can vary over an extremely wide range, satisfactory silicone rubbers being obtained with from about 20 to 300 parts by weight filler per 100 parts by weight of the polymer.

The silicone rubbers described above are useful in all of those applications where conventional silicone rubbers are useful and are particularly useful in applications requiring high strength and hydrolytic stability at either room temperature or elevated temperatures. In addition, because of the silicon-bonded phenyl groups containing trifluoromethyl substitutents, the silicone rubbers of the present invention are more resistant to the swelling effect of aliphatic hydrocarbon solvents than are conventional silicone rubbers in which the substituents are hydrocarbon groups. In addition, because of the high phenyl content of these rubbers, the resistance to irradiation is also improved over the resistance to irradiation of conventional methyl silicone rubbers. Thus, the silicone rubbers of the present invention are particularly useful as seals for automotive transmissions and as flexible supports for elements to be used in atomic reactors.

The following examples are illustrative of the practice of my invention and are not intended for purposes of limitation. All parts are by weight.

The bis(m-trifluoromethylphenyl)dichlorosilane used in Example 1 below was prepared by refluxing a mixture of 225 parts of m-trifluoromethylphenylbromide, 24 parts of magnesium turnings and 700 parts diethyl ether for four hours and cooling the resulting Grignard reagent to 0° C. Over a period of 1.5 hours 85 parts of silicon tetrachloride was added and the resulting mixture was fractionally distilled to produce the bis(m-trifluoromethylphenyl)dichlorosilane which boiled at 86 to 90° C. at 0.09 mm.

*Example 1*

To a solution of 12.2 parts pyridine in 170 parts diethyl ether were simultaneously added a solution of 15.8 parts of bis(m-trifluoromethylphenyl)dichlorosilane in 60 parts diethyl ether and a solution of 16.9 parts of tetraphenyldisiloxanediol-1,3 in 55 parts diethyl ether. After the addition, the reaction mixture was stirred and allowed to stand for 16 hours, during which time pyridine hydrochloride precipitated. This precipitate was removed by filtration and the ether was removed by evaporation, resulting in an oily residue. This residue was dissolved in toluene and some additional pyridine hydrochloride precipitate was removed. The toluene was then removed by evaporation resulting in a crude solid product. These solids were recrystallized several times from a mixture of equal volumes of hot cyclohexane and ethanol to produce 1,1-bis(m-trifluoromethylphenyl)-3,3,5,5-tetraphenylcyclotrisiloxane having the formula:

(5)

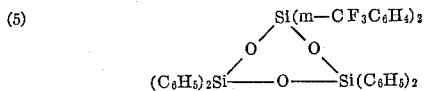

This material was a white crystalline solid having a melting point of 111.5 to 113° C. Infrared analysis of this material showed a peak at 9.8 microns corresponding to the cyclotrisiloxane ring, a doublet at 8.9 microns and a peak at 13.9 microns corresponding to the diphenylsiloxane groups and peaks at 7.5, 8.6, 9.3 and 12.5 microns corresponding to the trifluoromethylphenyl groups. Elemental analysis of this material showed the presence of 62.5% carbon, 4.2% hydrogen, 11.6% silicon and 15.4% fluorine as compared with the theoretical values of 62.5% carbon, 3.8% hydrogen, 11.5% silicon and 15.6 fluorine.

*Example 2*

A polymer was prepared by heating 7.5 parts of the cyclopolysiloxane of Example 1 to a temperature of 125° C. and subjecting the resulting molten material to a pressure of 10 microns to remove any entrained moisture and air. To the molten material was then added 0.1 part of a 0.4% potassium hydroxide solution in octamethylcyclotetrasiloxane. Upon completion of the addition, polymerization began at once. At the end of 20 minutes, a high molecular weight polydiorganosiloxane was formed which consisted essentially of the following recurring structural units:

(6)  —(C$_6$H$_5$)$_2$Si—O—(C$_6$H$_5$)$_2$
        Si—O—(m—CF$_3$C$_6$H$_4$)$_2$Si—O—

This polymer was a hard, solid material which was soluble in toluene and which had an intrinsic viscosity of 1.07 deciliters per gram in toluene at 30° C. The molecular weight of this polymer was about 360,000. This polymer contained about 5,000 of the recurring structural units of Formula 6 per molecule. The infrared curve of this polymer corresponded to the infrared curve of the cyclic polydiorganosiloxane of Example 1, except that absorption bands corresponding to the cyclotrisiloxane ring were no longer present. An encapsulated transformer is prepared by placing a transformer in a container, heating a portion of this polymer to a temperature of 100° C., at which temperature it softens, and forcing the polymer in the space between the container and the transformer. After cooling to room temperature, the encapsulated transformer is removed from the container.

*Example 3*

A cyclic polysiloxane is prepared by adding a solution of 25 parts of hexaphenyltrisiloxanediol-1,5 in 100 parts diethyl ether to a solution of 20 parts methylhexafluoroxylyldichlorosilane and 20 parts pyridine in 300 parts diethyl ether. The reaction mixture is stirred and allowed to stand for 16 hours and the pyridine hydrochloride precipitate which forms is removed by filtration and the diethyl ether solvent is evaporated, resulting in a solid material. This material is dissolved in hot toluene and a minor amount of undissolved pyridine hydrochloride is removed by filtration. The toluene is stripped from the solution resulting in a crude product which is recrystallized from a mixture of 3 parts by volume of cyclohexane and 1 part by volume of ethanol to produce 1-methyl-1-bis(trifluoromethyl)phenyl-3,3,5,5,7,7 - hexaphenylcyclotetrasiloxane having the formula:

(7)

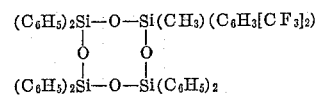

This material is a crystalline solid whose identity is confirmed by infrared analysis which indicates the presence of the cyclotetrasiloxane ring, the diphenylsiloxane groups, the methyl silyl group and the bis(trifluoromethyl)phenyl silyl group. A copolymer is prepared by heating a mixture of the foregoing cyclotetrasiloxane with an equal part by weight of octamethylcyclotetrasiloxane, heating the resulting mixture at a temperature of 150° C. to form a molten material and adding 0.08 part of a 0.05% solution of potassium hydroxide in octamethylcyclotetrasiloxane. At the end of 30 minutes, the material polymerizes to a high molecular weight polydiorganosiloxane which is converted to a silicone rubber by irradiation to a dose of 100×10$^6$ roentgens with 800 kilovolt peak electrons.

*Example 4*

Following the procedure of Example 1, p-trifluoromethylphenyl pentaphenylcyclotrisiloxane is formed by reacting equimolar amounts of phenyl-p-trifluoromethylphenyldichlorosilane and tetraphenyldisiloxanediol-1,3. The resulting material has the formula:

(8)

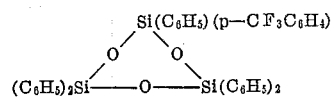

Following the procedure of Example 2, this cyclopolysiloxane is rearranged and condensed with potassium hydroxide to form a high molecular weight polydiorganosiloxane consisting essentially of the following recurring structural units:

(9)  —(C$_6$H$_5$)$_2$Si—O—(C$_6$H$_5$)$_2$Si—O—
            (C$_6$H$_5$)(p—CF$_3$C$_6$H$_4$)Si—O—

This high molecular weight material is used to encapsulate a transformer by the process of Example 2.

What I claim as new and desire to secure by Letters Patent of the United States is:

1. A cyclic polydiorganosiloxane having the formula:

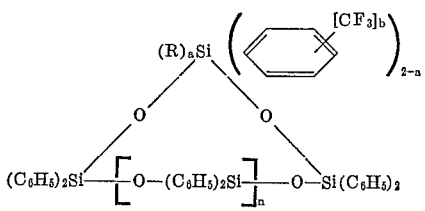

where R is a monovalent hydrocarbon radical free of aliphatic unsaturation, $a$ and $n$ are whole numbers equal to from 0 to 1, inclusive, and $b$ is an integer equal to from 1 to 3, inclusive.

2. The cyclic polydiorganosiloxane of claim 1 in which R is phenyl.

3. The compound 1,1-bis(m-trifluoromethylphenyl)-3,3,5,5-tetraphenylcyclotrisiloxane having the formula:

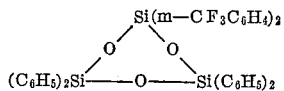

4. A linear polydiorganosiloxane consisting essentially of the following recurring structural units:

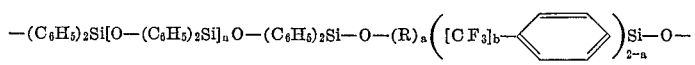

where R is a monovalent hydrocarbon radical free of aliphatic unsaturation, $a$ and $n$ are whole numbers equal to from 0 to 1, inclusive, and $b$ is an integer equal to from 1 to 3, inclusive, said polydiorganopolysiloxane having a molecular weight greater than about 10,000.

5. A linear polydiorganosiloxane consisting essentially of the following recurring structural units:

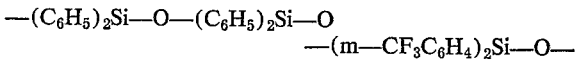

and having a molecular weight greater than about 10,000.

References Cited

UNITED STATES PATENTS

| | | | |
|---|---|---|---|
| 2,571,090 | 10/1951 | Kohl | 260—448.2 |
| 2,629,725 | 2/1953 | Hyde | 260—448.2 |
| 2,636,896 | 4/1953 | Frost | 260—448.2 |
| 2,640,066 | 5/1953 | Kohl | 260—448.2 |
| 2,684,379 | 7/1954 | Guillissen et al. | 260—448.2 |
| 2,780,636 | 2/1957 | Wright et al. | 260—448.2 |
| 2,954,391 | 9/1960 | Riley et al. | 260—448.2 |
| 3,037,962 | 6/1962 | Hartung et al. | 260—448.2 |
| 3,105,061 | 9/1963 | Bruner | 260—448.2 |
| 3,122,579 | 2/1964 | Leitheiser | 260—448.2 |

FOREIGN PATENTS 800,280    8/1958    Great Britain.

OTHER REFERENCES

Eaborn: "Organosilicon Compounds," Academic Press Inc., N.Y., publishers, 1960, page 237.

TOBIAS E. LEVOW, *Primary Examiner.*
SAMUEL H. BLECH, *Examiner.*
P. D. FRIEDMAN, J. G. LEVITT, P. F. SHAVER,
                                *Assistant Examiners.*